United States Patent [19]

Tsutsui et al.

[11] Patent Number: 5,798,806
[45] Date of Patent: Aug. 25, 1998

US005798806A

[54] SPATIAL LIGHT MODULATOR AND PROJECTOR

[75] Inventors: Hiroshi Tsutsui, Yawata; Kazunori Komori, Sanda; Kazuhiro Nishiyama, Hirakata; Yasunori Kuratomi, Suita; Akio Takimoto; Koji Akiyama, both of Neyagawa; Shinichi Mizuguchi, Katano, all of Japan

[73] Assignee: Matsushita Electric Industrial Co., Ltd., Osaka-fu, Japan

[21] Appl. No.: 843,611

[22] Filed: Apr. 10, 1997

[30] Foreign Application Priority Data

Apr. 11, 1996 [JP] Japan .................. 8-089223

[51] Int. Cl.$^6$ .............. G02F 1/135; G02F 1/1333
[52] U.S. Cl. .............. 349/29; 349/110; 349/27; 349/7
[58] Field of Search ................ 349/25, 27, 29, 349/110, 7

[56] References Cited

U.S. PATENT DOCUMENTS

| | | | |
|---|---|---|---|
| 4,913,531 | 4/1990 | Efron et al. | 350/342 |
| 5,384,649 | 1/1995 | Takimoto et al. | 349/29 |
| 5,583,676 | 12/1996 | Akiyama et al. | 349/28 |
| 5,594,567 | 1/1997 | Akiyama et al. | 349/29 |
| 5,612,798 | 3/1997 | Tuki | 349/29 |
| 5,612,800 | 3/1997 | Braatz et al. | 349/27 |
| 5,640,260 | 6/1997 | Sumida | 349/29 |
| 5,694,182 | 12/1997 | Mitsuoka et al. | 349/27 |

FOREIGN PATENT DOCUMENTS

| | | |
|---|---|---|
| 5-333366 | 12/1993 | Japan . |
| 6-51341 | 2/1994 | Japan . |
| 6-59272 | 3/1994 | Japan . |

*Primary Examiner*—Anita Pellman Gross
*Assistant Examiner*—Tiep H. Nguyen
*Attorney, Agent, or Firm*—Wenderoth, Lind & Ponack, L.L.P.

[57] ABSTRACT

A spatial light modulator (SLM) providing effects light blocking of even strong incident light without reducing the photoelectric conversion efficiency, and a projector using said SLM, are disclosed. Said projector uses an SLM comprising a readout side glass substrate comprising a readout side transparent electrode; a light modulation layer for modulating incident light according to an applied voltage; a reflective electrode comprising plural electrode elements for applying a voltage to the light modulation layer, and reflecting the light passed by the readout side glass substrate, the readout side transparent electrode, and light modulation layer; a light blocking layer having plural holes; a drive electrode comprising plural electrode elements electrically connected through the holes in the light blocking layer to a corresponding electrode element of the reflective electrode; and voltage applying means for applying a voltage corresponding to the brightness of each pixel in the input image to each electrode element of the drive electrode.

13 Claims, 6 Drawing Sheets

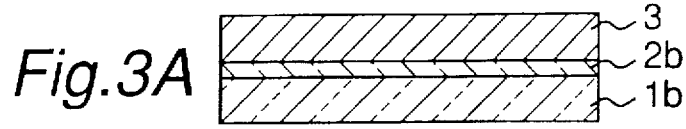
Fig.3A
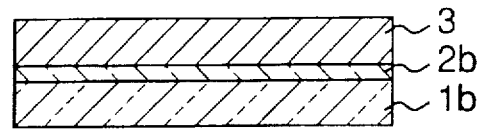
Fig.3B
Fig.3C
Fig.3D
Fig.3E
Fig.3F
Fig.3G

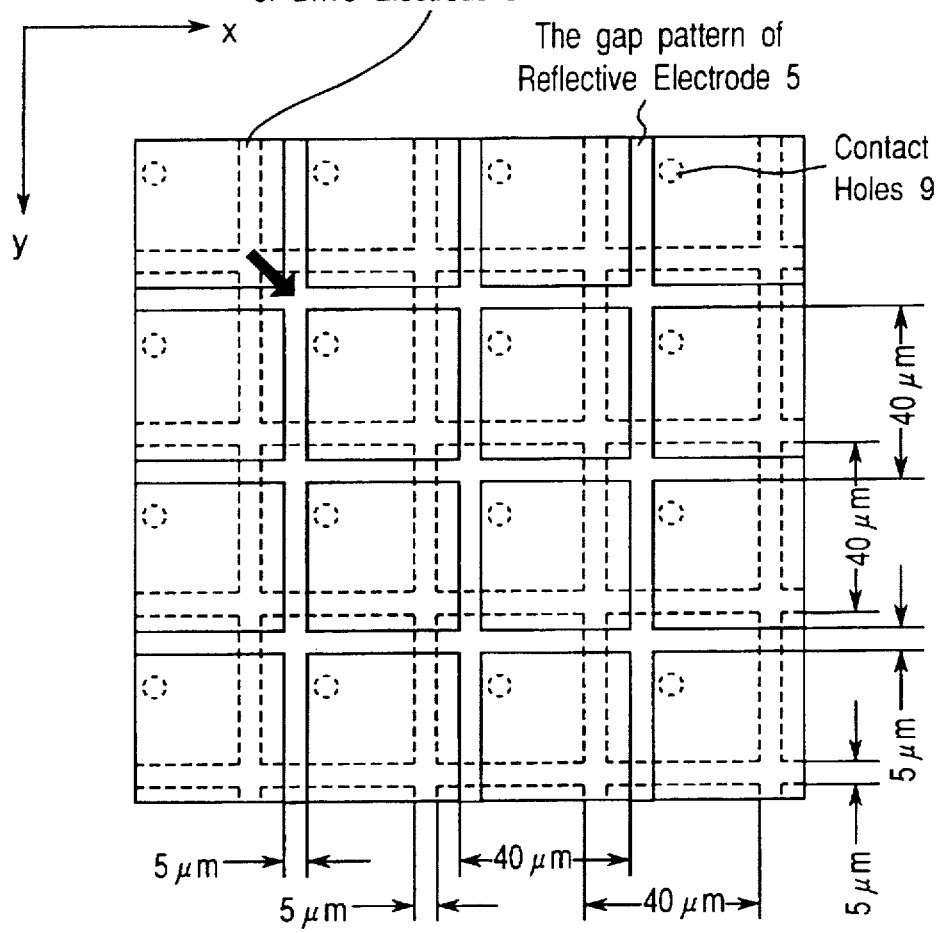

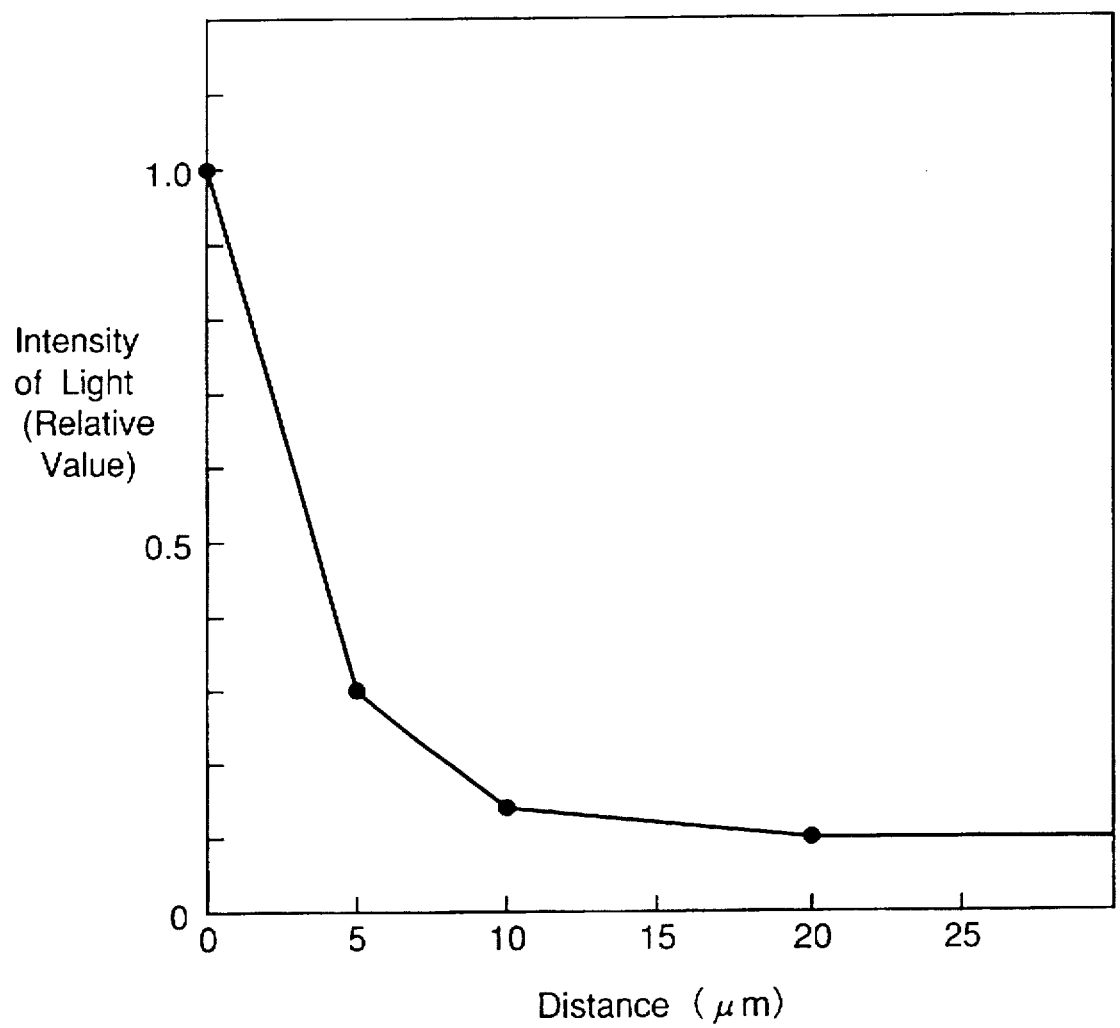

SPATIAL LIGHT MODULATOR AND PROJECTOR

BACKGROUND OF THE INVENTION

1. Field of the invention

The present invention relates to a spatial light modulator used in projectors for presenting on a large screen images displayed on a CRT or similar display device, and to a projector using said spatial light modulator.

2. Description of the prior art

Image display devices used for projection enlargement and presentation of images displayed on a CRT or similar monitor have been a target of development in recent years. This is because it is difficult to significantly enlarge conventional direct-view CRTs, and the resolution deteriorates when brightness is increased in projection devices using CRTs or thin-film-transistor (TFT) driven liquid crystal displays (LCD). To resolve these problems, projectors using spatial light modulation elements comprising a photoconductor layer and light modulation layer have been developed. The technology of such devices is disclosed in Japanese patent laid-open publication number 7-84282 and USP 4913531. The conventional technology is described below with reference to the figures.

FIG. 9 is a perspective view of part of a conventional spatial light modulator (SLM). As shown in FIG. 9, a transparent electrode 92b is formed on a glass substrate 91b, and an amorphous silicon (a-Si) photoconductor layer 93 etched in a grid pattern is formed on the transparent electrode 92b. The grid-shaped grooves formed by etching are filled with a light-blocking material. A reflective electrode 95 comprising plural divided electrodes is formed in the rectangular parts defined by and between the grooves of this grid. Another transparent electrode 92a is formed on a further glass substrate 91a.

The glass substrate 91a on which are disposed the transparent electrode 92b, a-Si photoconductor layer 93, light blocking layer 94, and reflective electrode 95, and the glass substrate 91b on which the other transparent electrode 92a is disposed are then combined with a uniform gap formed therebetween by placing beads 97 between the transparent electrode 92a and reflective electrode 95. The spatial light modulator (SLM) 90 is completed by then filling this gap with a liquid crystal material to form a liquid crystal (LC) light modulation layer 96.

In the SLM 90 thus formed, the a-Si photoconductor layer 93 produces charges and changes the voltages applied to the reflected electrodes corresponding to the brightness of each pixel in the input image projected through glass substrate 91b by means of photoelectric conversion. The reflective electrode 95 applies the voltages generated by the a-Si photoconductor layer 93 to the LC layer 96. Strong incident light from the glass substrate 91a side of the SLM 90 is modulated by the LC layer 96 according to the voltage applied by the reflective electrode 95, and is then reflected by the reflective electrode 95. The light blocking layer 94 is provided to prevent the strong incident light from the glass substrate 91a side from leaking to the a-Si photoconductor layer 93 of the device from the gaps between the electrodes of the reflective electrode 95.

Note that the grid grooves formed in the a-Si photoconductor layer 93 must be both deep and wide and then filled with a large amount of a light blocking material in order to prevent strong incident light from the glass substrate 91a from passing the light blocking layer 94 and leaking to the a-Si photoconductor layer 93. This method, however, reduces the volume of the a-Si photoconductor layer 93, and thus reduces the photoelectric conversion efficiency.

SUMMARY OF THE INVENTION

Therefore, the object of the present invention is to provide a spatial light modulator (SLM) having a high light blocking effect to strong incident light without reducing the photoelectric conversion efficiency.

The object of an SLM according to the first embodiment of the invention is to achieve a high light blocking effect to strong incident light without reducing the photoelectric conversion efficiency by forming a light blocking layer on the inside surface of the reflective electrode and managing the overlap of two gap patterns.

The object of an SLM according to the second embodiment of the invention is to achieve a high light blocking effect to strong incident light by forming a light blocking layer on the inside surface of the reflective electrode to prevent strong incident light from leaking to the voltage storage circuit.

The object of a projector according to the present invention is to present by projection enlargement bright, high quality images using strong incident light by using an SLM according to the above first or second embodiment of the invention.

BRIEF DESCRIPTION OF THE DRAWINGS

The present invention will become more fully understood from the detailed description given below and the accompanying diagrams wherein:

FIG. 3A–3G are used to describe the manufacturing process used for the spatial light modulator according to the first embodiment of the invention.

FIG. 4 is a plan view of the overlapping gap patterns of reflective electrode 5 and drive electrode 8.

FIG. 5 is a graph showing the relationship between light blocking efficiency and the movement distance of the gap pattern of the reflective electrode 5.

DESCRIPTION OF PREFERRED EMBODIMENTS

The preferred embodiments of the present invention are described below with reference to the accompanying figures.

Embodiment 1

Figure 1:
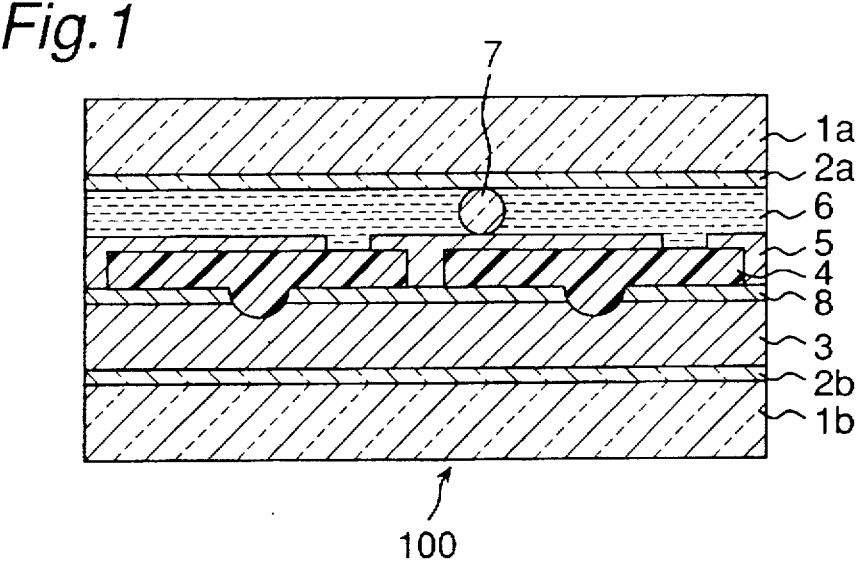
FIG. 1 is a cross section of a spatial light modulator according to the first embodiment of the invention.

FIG. 1 is a cross section of a spatial light modulator (SLM) 100 according to the first embodiment of the invention. Referring to FIG. 1, the SLM 100 will be known to comprise transparent electrodes 2a and 2b on glass substrates 1a and 1b, respectively. An a-Si photoconductor layer 3 is formed on the transparent electrode 2b, and drive electrode 8, which is formed on the a-Si photoconductor layer 3, comprises plural electrodes. A light blocking layer 4 is formed on the drive electrode 8. A reflective electrode 5 comprising plural electrodes is formed on the light blocking layer 4.

The SLM 100 is then assembled by forming a uniform gap between the glass substrate 1a comprising the transparent electrode 2b, a-Si photoconductor layer 3, drive electrode 8, light blocking layer 4, and reflective electrode 5, and the glass substrate 1b comprising the transparent electrode 2a, and disposing in this gap a liquid crystal light modulation layer 6. More specifically, this uniform gap is formed by disposing beads 7 between the transparent electrode 2a of the one glass substrate 1a and the reflective electrode 5 of the other glass substrate 1b.

Figure 2:
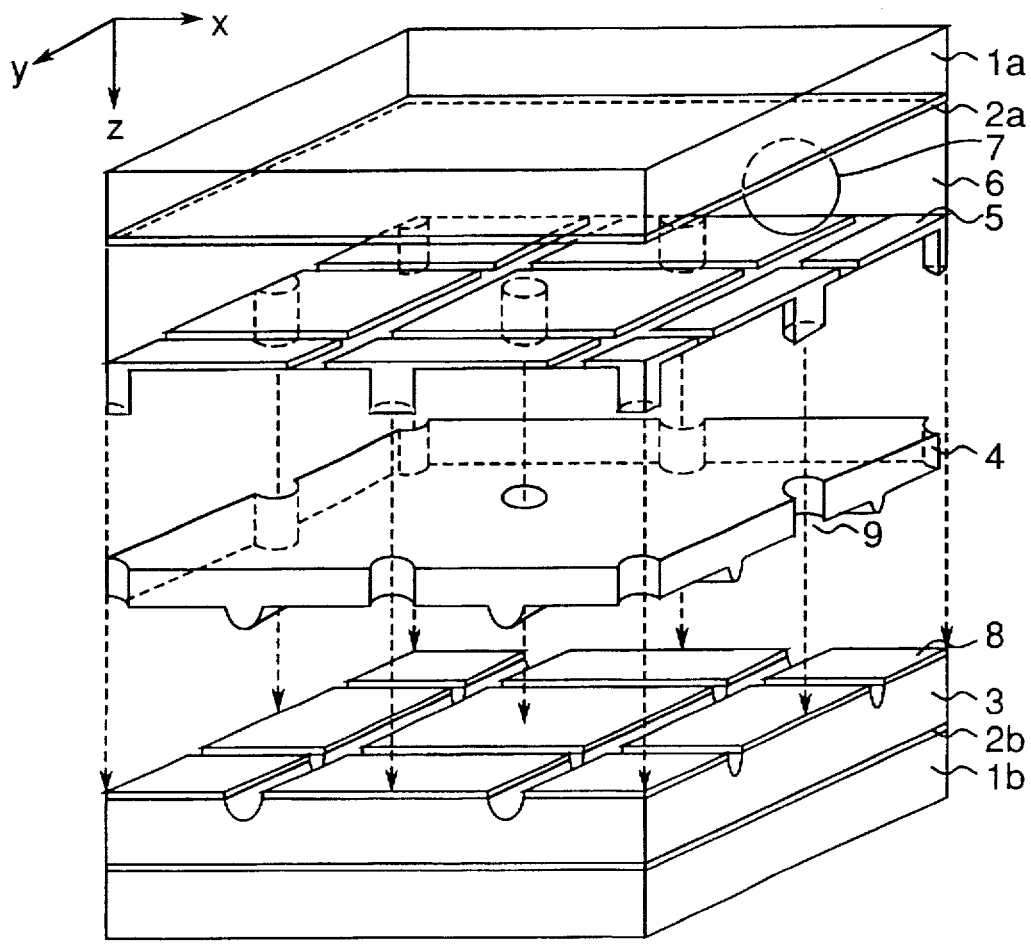
FIG. 2 is a partially exploded perspective view of the construction of a spatial light modulator according to the first embodiment of the invention.

FIG. 2 is a perspective view of one part of the SLM 100 showing specifically a layer comprising glass substrate 1a, transparent electrode 2a, liquid crystal (LC) layer 6, and beads 7, and a layer comprising the light blocking layer 4, glass substrate 1b, transparent electrode 2b, a-Si photoconductor layer 3, and drive electrode 8.

Referring to FIG. 2, the a-Si photoconductor layer 3 has grooves in a rectangular grid pattern (specifically a square lattice pattern in the present embodiment) formed in the surface of the a-Si photoconductor layer 3 facing the light blocking layer 4. Each of the electrodes of the drive electrode 8 is therefore a square electrode disposed over the area between the lattice grooves in the a-Si photoconductor layer 3.

The reflective electrode 5 is provided on the back of the LC layer 6 in FIG. 2. Reflective electrode 5 also comprises square electrodes of the same size as the electrodes of the drive electrode 8, and also has electrode gaps of the same width.

The light blocking layer 4 is formed between the reflective electrode 5 and drive electrode 8 covering the entire surface area thereof, and comprises a matrix of plural contact holes 9. One electrode of the reflective electrode 5 is electrically connected to one electrode of the drive electrode 8 through contact holes 9.

For the purposes of the following description, three perpendicular coordinate axes x, y, and z are defined as shown in FIG. 2. Thus, the structure on the x-y plane associated with the electrode gaps of the reflective electrode 5 and drive electrode 8 is referred to below as the "gap pattern" of the reflective electrode 5 and drive electrode 8, respectively. Note that the gap pattern of the reflective electrode 5 is identical to the gap pattern of the drive electrode 8 in this embodiment.

The process for manufacturing the SLM 100 of the invention is described next below with reference to FIG. 3A to FIG. 3G. As shown in FIG. 3A, an ITO (thin-film indium tin oxide) transparent electrode 2b is formed on the glass substrate 1b, and a 2 µm thick a-Si photoconductor layer 3 is then formed by plasma CVD over transparent electrode 2b on the glass substrate 1b. This a-Si photoconductor layer 3 has a three-layer pin structure in p-i-n sequence from the transparent electrode 2b. In this pin structure, the n layer has lower resistance than the p and i layer.

As shown in FIG. 3B, a 5000 Å (angstrom) thick chrome layer formed by sputtering onto the a-Si photoconductor layer 3 is then divided by photolithography to form the drive electrode 8. The drive electrode 8 comprises plural square electrodes formed at a 40 µm pitch with a 5 µm gap between adjacent electrodes.

The next step is to remove the layer with the lowest resistance, i.e., the n layer, from the a-Si photoconductor layer 3 by means of active ion etching using the gap pattern of the drive electrode 8 (FIG. 3C). Any two adjacent electrodes in the drive electrode 8 can thus be electrically isolated.

As shown in FIG. 3D, the light blocking layer 4 is then formed on the drive electrode 8. Materials that can be used for the light blocking layer 4 include UV-cure type acrylic resins containing a carbon or pigment dispersion. The light blocking layer 4 is formed by applying the material in a spin coating process using a spinner, and then forming the 5 µm thick light blocking layer 4 by ultraviolet polymerization. If the width and depth of the lattice grooves in the a-Si photoconductor layer 3 are dimensions that can be ignored in comparison with the thickness of the light blocking layer 4, the surface of the light blocking layer 4 will be smooth. It should be noted that the material used for the light blocking layer 4 shall not be limited to UV-cured materials, and thermosetting acrylic resins or epoxy resins can be alternatively used.

A photolithographic method is again used to form in the surface of the light blocking layer 4 contact holes 9 extending from the surface of the light blocking layer 4 to each of the electrodes in the drive electrode 8 (FIG. 3E).

A 1000 Å thick aluminum layer is then formed by sputtering onto the same surface of the light blocking layer 4 in which the contact holes 9 were formed (FIG. 3F). This aluminum layer is then segmented by a photolithographic method to form the reflective electrode 5. As is the drive electrode 8, this reflective electrode 5 comprises plural square electrodes formed at a 40 µm pitch with a 5 µm gap between adjacent electrodes. Each of the electrodes in the reflective electrode 5 is also passed through a contact hole 9 in the light blocking layer 4 and electrically connected to the corresponding electrode of the drive electrode 8. After an alignment layer is then applied over the reflective electrode 5, rubbing rollers are used for an alignment treat.

A transparent electrode 2a of ITO is also formed on the other glass substrate 1a, and the same alignment treating process used with the reflective electrode 5 is applied to the transparent electrode 2a.

The two panels are then combined using beads 7 disposed between the transparent electrode 2a and reflective electrode 5 to assure a uniform gap therebetween as shown in FIG. 3G, and liquid crystal is injected to this gap to form the LC layer 6. A 1 µm gap is assured using the beads 7 in the present embodiment. A ferroelectric liquid crystal material is used for the liquid crystals forming the LC layer 6 in this embodiment.

The operation of the SLM 100 thus comprised is described below.

An input image displayed on a CRT or other monitor, not shown in the figures, is projected through the glass substrate 1b and transparent electrode 2b to the a-Si photoconductor layer 3, which produces voltages corresponding to the brightness of each pixel in the input image by photoelectric conversion. Each electrode in the drive electrode 8 applies the voltage generated by the a-Si photoconductor layer 3 to the corresponding electrode of the reflective electrode 5 through the contact hole 9 in the light blocking layer 4. In other words, each electrode in the reflective electrode 5 applies to the LC layer 6 a voltage corresponding to the brightness of each pixel in the input image projected onto the a-Si photoconductor layer 3.

A strong incident light emitted from the glass substrate 1a side of the SLM 100 also passes the glass substrate 1a and transparent electrode 2a, and is incident on the LC layer 6. The incident light is then modulated according to the orientation of the liquid crystals in the LC layer 6, and this orientation changes according to the applied voltage. The reflective electrode 5 thus reflects the incident light modulated by the LC layer 6.

Therefore, the SLM 100 modulates and reflects the strong incident light from the glass substrate 1a side of the SLM 100 according to the brightness of each pixel in the input image projected from the glass substrate 1b side of the SLM 100 onto the a-Si photoconductor layer 3. The light blocking layer 4 is provided to prevent misoperation of the a-Si photoconductor layer 3 due to leakage of strong incident light from the glass substrate 1a side to the a-Si photoconductor layer 3.

The present embodiment of the invention is also designed to improve light blocking by means of the relative positions on the x-y plane of the gap patterns of the reflective electrode 5 and the drive electrode 8. By controlling the relative positions of the two gap patterns, incident light leaking to the light blocking layer 4 from gaps between the electrodes of the reflective electrode 5 is blocked by the opaque drive electrode 8 and can thus be prevented from leaking to the a-Si photoconductor layer 3.

The relationship between the relative gap pattern positions and light blocking is described below referring to the accompanying figures when the reflective electrode 5 and drive electrode 8 have an identical configuration.

FIG. 4 is a plan view on the x-y plane of the overlapping gap patterns of the reflective electrode 5 and drive electrode 8, and shows the gap pattern of the reflective electrode 5 moving parallel relative to the gap pattern in the drive electrode 8 from a position of coincidence between the patterns. In FIG. 4, the electrodes of both the reflective electrode 5 and drive electrode 8 are formed at a 40 μm pitch in the same pattern with a 5 μm gap between any two adjacent electrodes.

Therefore, if one pattern is moved relative to the other at least 5 μm in both x-axis and y-axis directions, i.e., if one pattern is offset 7 μm in the direction of the arrow as shown in FIG. 4, the area of the overlap between overlapping gap patterns will be the smallest overlap area possible. This overlapping part of the two gap patterns is below called the "gap overlap."

FIG. 5 is a graph of the relationship between the intensity of leakage light and the gap pattern offset when the reflective electrode 5 is moved parallel to the drive electrode 8 in the direction of the arrow shown in FIG. 4. In FIG. 5, the intensity of light leaking to the a-Si photoconductor layer 3 when the gap overlap area is greatest, i.e., when the gap patterns are coincident, is 1.

As shown in FIG. 5, the intensity of the leaked light is 13% when the reflective electrode 5 is moved 10 μm, i.e., approximately 7 μm in both x- and y-axis directions, and there is negligible further reduction achieved relative to any greater distance moved.

More specifically, good light blocking can be achieved by moving the reflective electrode 5 1.5 times the width of the gap between the electrodes from the position of the greatest gap overlap.

Because the light blocking layer 4 is formed over substantially the entire inside surface of the reflective electrode 5, no further reduction in the photoelectric conversion efficiency of the a-Si photoconductor layer 3 is achieved by increasing the amount of the light blocking material.

Thus controlling the overlap of the two gap patterns also causes any incident light passing the light blocking layer 4 through gaps between electrodes of the reflective electrode 5 to be blocked by the drive electrode 8, and can thereby reduce the effect of such incident light on photoelectric conversion by the a-Si photoconductor layer 3.

It should be noted that providing a dielectric multilayer 10 between the reflective electrode 5 and LC layer in the present embodiment is also an effective means of improving light blocking.

Figure 6:
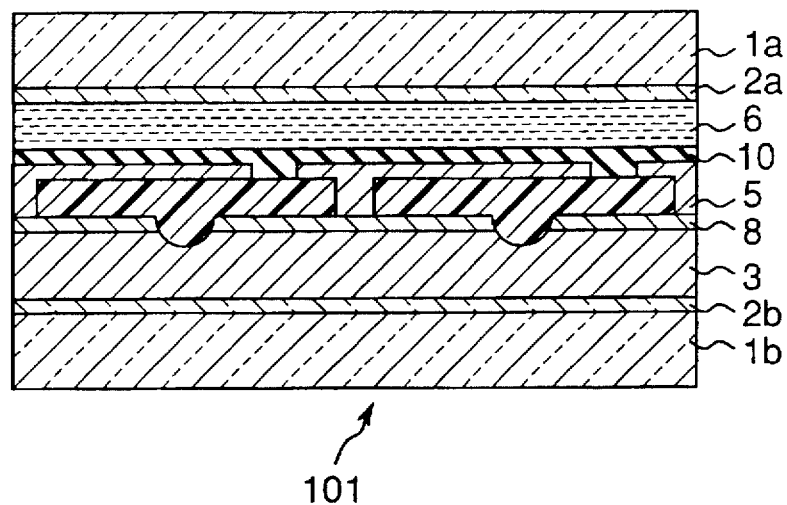
FIG. 6 is a cross section of a structure comprising a dielectric multilayer 10 in the spatial light modulator according to the first embodiment of the invention.

FIG. 6 is a cross section of part of a spatial light modulator (SLM) 101 comprising a dielectric multilayer 10 between the reflective electrode 5 and LC layer 6. The dielectric multilayer 10 has a structure of multiple layers of $TiO_2$ and $SiO_2$ with good reflectance to perpendicularly incident light, i.e., light incident from the z-axis. As a result, light blocking is further improved by means of the dielectric multilayer 10 reflecting perpendicular incident light incident on the gap overlap.

It should further be noted that while the electrodes of the reflective electrode 5 and drive electrode 8 have been described by way of example only above as square in shape, the invention shall not be so limited and said electrodes can be otherwise polygonally shaped with the same effects achieved. For example, the same effects can be achieved when the electrodes are hexagonally shaped.

Even if the gap width of reflective electrode 5 is different from the gap width of drive electrode 8, when each electrode element of the reflective electrode 5 is disposed at a position offset at least a similar distance in a same direction parallel to the drive electrode 8 from the position whereat the center line of the gap between adjacent electrodes of the reflective electrode 5 is coincident with the center line of the gap between adjacent electrodes of the drive electrode 8, the same effects can be achieved.

In the following description, the operation of applying a voltage corresponding to the brightness of each pixel in the input image is referred to as "writing" an image to the SLM. The operation of modulating the incident light according to the brightness of each pixel in the input image and reflecting the modulated light is referred to as "reading" an image from the SLM. The glass substrate 1a side of the SLM is accordingly called the "readout side" and the glass substrate 1b side is called the "write side."

In this first embodiment, the glass substrate 1b, transparent electrode 2b, and a-Si photoconductor layer 3 form a voltage applying means applying to each electrode of the drive electrode 8 a voltage corresponding to the brightness of each pixel in the input image, and thus accomplishes optical writing by means of photoelectric conversion.

Embodiment 2

A spatial light modulator according to the second embodiment of the present invention is described below with reference to FIG. 7, a cross section of part of a spatial light modulator (SLM) 102 according to said second embodiment. Note that parts of like function are referenced using the same reference numbers in FIG. 7 as in FIG. 1 and FIG. 2, and further description thereof is thus omitted below.

Figure 7:
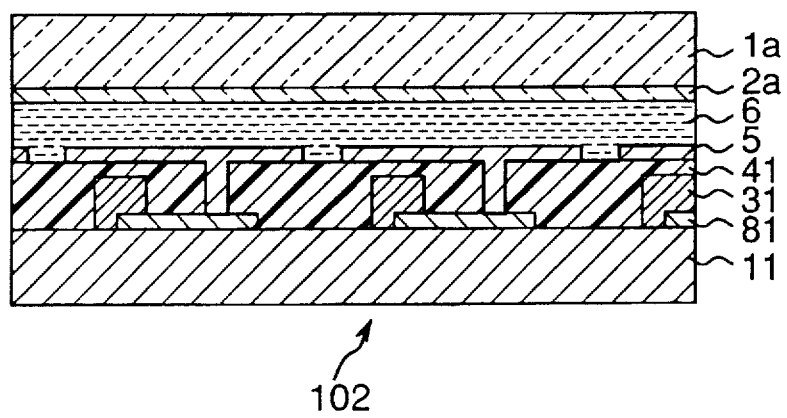
FIG. 7 is a cross section of a spatial light modulator according to the second embodiment of the invention.

As shown in FIG. 7, active element 31 comprises plural thin-film transistors (TFT) arrayed in a matrix on a glass substrate 11. The drive electrode 81 comprises plural electrodes formed on the glass substrate 11, and these electrodes are electrically connected through the contact holes 91 in the light blocking layer 41 to the electrodes of the reflective electrode 5 and the TFT of the active element 31.

A voltage storage circuit comprising the silicon substrate 11 and active element 31 and applying a voltage according to the input image to the electrodes of the drive electrode 8 is used as the voltage applying means in this embodiment. Note that this voltage applying means writes electrically using an electrical signal, and thus differs from the optical-writing method of the first embodiment.

The operation of the SLM 102 in this embodiment is described below.

A voltage corresponding to the brightness of each pixel in the input image is applied from an external source to the active element 31 as an electrical signal, and is accumulated in each TFT. Each electrode of the drive electrode 81 applies the voltage stored by each TFT of the active element 31 to the corresponding electrode of the reflective electrode 5 via a contact hole 91 in the light blocking layer 41. In other words, each electrode in the reflective electrode 5 applies to the LC layer 6 a voltage corresponding to the brightness of the corresponding pixel in the input image.

A strong incident light emitted from the glass substrate 1a side of the SLM 102 also passes the glass substrate 1a and transparent electrode 2a, and is incident on the LC layer 6. The incident light is then modulated according to the orientation of the liquid crystal in the LC layer 6, and this orientation changes according to the voltage applied thereto. The reflective electrode 5 thus reflects the incident light modulated by the LC layer 6.

Therefore, the SLM 102 modulates and reflects the strong incident light from the glass substrate 1a side of the SLM 102 according to the brightness of each pixel in the input image. Note that in this embodiment the light blocking layer 41 is provided below the reflective electrode 5 covering the TFT on the glass substrate to prevent misoperation of the TFT due to leakage of strong incident light from the glass substrate 1a side.

As with the configuration of the first embodiment shown in FIG. 6, light blocking can be further improved in the present embodiment by providing the dielectric multilayer 10 between the reflective electrode 5 and LC layer 6.

Furthermore, the same effect can be achieved by using a MOS transistor on a silicon substrate in place of a TFT as the active element, or using random access memory (RAM) on a silicon substrate as the voltage storage circuit.

Embodiment 3

Figure 8:
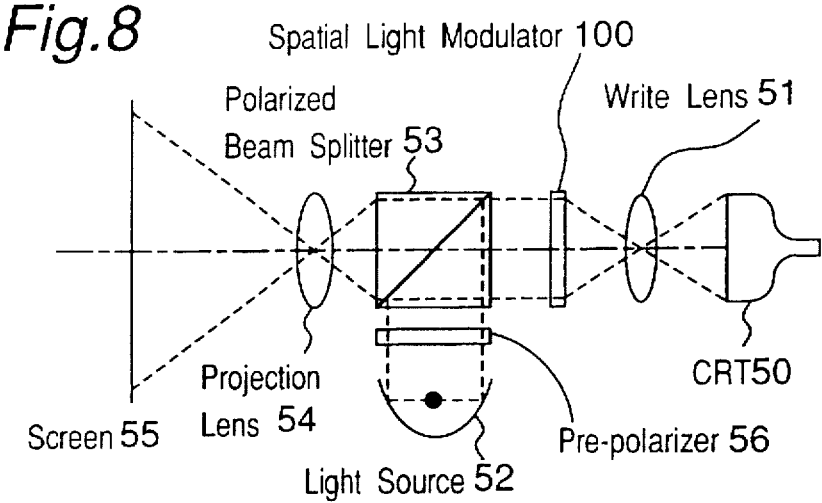
FIG. 8 is a block diagram of a projector according to the present invention.
Figure 9:
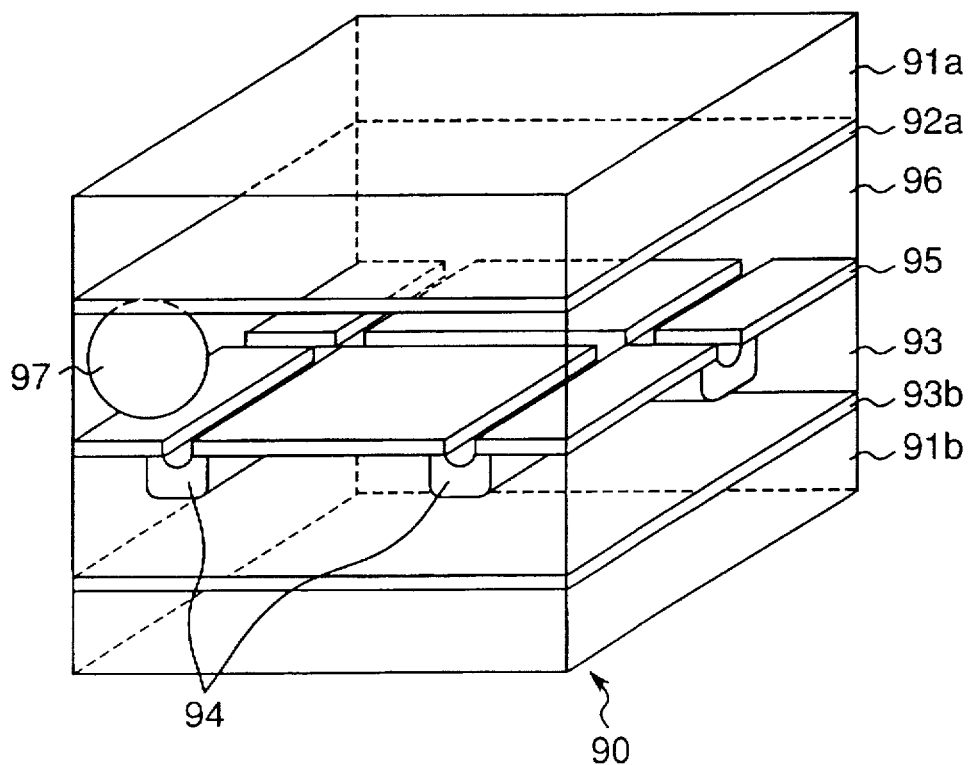
FIG. 9 is a perspective view of the structure of a spatial light modulator according to the prior art.

FIG. 8 is a block diagram of a projector applying the SLM 100 of the present invention.

As will be known from FIG. 8, the projector of the invention comprises an SLM 100, a CRT 50, a write lens 51, a light source 52, a polarized beam splitter 53, a projection lens 54, a screen 55, and a pre-polarizer 56.

The operation of the projector according to the present invention is described below referring to FIG. 8.

The image displayed on the CRT 50 is condensed by the write lens 51 and projected through the glass substrate 1b and transparent electrode 2b of the SLM 100 onto the a-Si photoconductor layer 3.

The light source 52 emits a strong beam to the pre-polirizer 56. The pre-polirizer 56 separates the light from the light source 52 into p and s waves, and passes only the p wave component. The polarized beam splitter 53 reflects only the p wave component of the emitted beam and passes the s wave component. As a result, only the p wave component of the light from the light source 52 is reflected and emitted to the glass substrate 1a side of the SLM 100 as incident light. This p wave component incident light is then modulated to s wave light by the LC layer 6 according to the voltage applied by the reflective electrode 5, and is then reflected by the reflective electrode 5. As a result, the reflected light reflected by the SLM 100 contains an s wave component corresponding to the brightness of each pixel in the input image from the CRT 50.

The s wave component of this light produced by the SLM 100 passes the polarized beam splitter 53, is condensed by the projection lens 54, and projected onto the screen 55.

The projector of the present invention can thus project an image displayed on the CRT 50 enlarged onto the screen 55.

It will also be obvious that the alternative SLM 101 described above can be used to identical effect in place of the SLM 100 used by way of example only in the projector of the invention described above.

It will also be obvious that the electrical-write type SLM 102 described above as the second embodiment can be used in place of the optical-write type SLM 100 above. It is also possible to provide an image signal source outputting an electrical signal as the input image in place of the CRT 50 and write lens 51 used above with the output signal of this image signal source input to the SLM 102.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A spatial light modulator (SLM) comprising:
   a readout side glass substrate comprising a readout side transparent electrode,
   a light modulation layer for modulating incident light according to an applied voltage,
   a reflective electrode comprising plural electrode elements for applying a voltage to the light modulation layer, and reflecting the light passed by the readout side glass substrate, readout side transparent electrode, and light modulation layer,
   a light blocking layer having plural holes,
   a drive electrode comprising plural electrode elements electrically connected through the holes in the light blocking layer to the corresponding electrode element of the reflective electrode, and
   voltage applying means for applying a voltage corresponding to a brightness of each pixel in an input image to each of the electrode element of the drive electrode.

2. The SLM according to claim 1 wherein the voltage applying means comprises:
   a write side glass substrate comprising a write side transparent electrode, and
   a photoconductor layer disposed on the write side transparent electrode for generating and applying to each of the electrode elements of the drive electrode a voltage corresponding to the brightness of each pixel in the input image projected through the write side glass substrate and the write side transparent electrode.

3. The SLM according to claim 2 wherein each of the electrode elements of the reflective electrode is disposed at a position offset at least a particular distance in a particular direction parallel to the drive electrode from a position whereat a center line of a gap between adjacent electrodes of the reflective electrode is coincident with a center line of a gap between adjacent electrodes of the drive electrode.

4. The SLM according to claim 1 wherein the voltage applying means is a voltage storage circuit comprising plural active elements formed in a matrix pattern for holding a voltage corresponding to a brightness of each pixel in the =input image input as an electrical signal, and applying said voltages to the electrode elements of the drive electrode.

5. The SLM according to claim 4 wherein the active elements are thin-film transistors.

6. The SLM according to claim 4 wherein the active elements are MOS transistors.

7. The SLM according to claim 4 wherein the voltage storage circuit is random access memory (RAM).

8. The SLM according to claims 1 wherein a dielectric multilayer is formed on the surface of the reflective electrode contacting the light modulation layer and on the surface of the light blocking layer contacting the light modulation layer.

9. The SLM according to claims 1 wherein the light blocking layer is made from a resin containing as a major component thereof carbon, pigment, or inorganic material either singly or in mixture.

10. The SLM according to claims 1 wherein the light modulation layer is a liquid crystal layer.

11. A projector comprising a screen, an image supply means for supplying an input image, a spatial light modulator (SLM) for modulating and reflecting light incident to its readout side according to a brightness of each pixel in the input image, a light source for emitting said incident light, a polarized beam splitter for reflecting said incident light to the readout side of the SLM, and passing only a particular polarized light component of the reflected light from the SLM, and a projection lens for focusing and projecting to said screen the light passed by the polarized beam splitter, wherein the SLM comprises:

a readout side glass substrate comprising a readout side transparent electrode, a light modulation layer for modulating incident light according to an applied voltage, a reflective electrode comprising plural electrode elements for applying a voltage to the light modulation layer, and reflecting the light passed by the readout side glass substrate, readout side transparent electrode, and light modulation layer, a light blocking layer having plural holes, a drive electrode comprising plural electrode elements electrically connected through the holes in the light blocking layer to the corresponding electrode elements of the reflective electrode, and voltage applying means for applying a voltage corresponding to the brightness of each pixel in the input image to each of the electrode element of the drive electrode.

12. The projector according to claim 11 wherein the image supply means comprises a CRT for presenting the input image, and a lens for concentrating said input image, and projects the input image onto said SLM which is of an optical-write type.

13. The projector according to claim 11 wherein the image supply means comprises an image signal source for outputting said input image as an electrical signal, and inputs the output signal of said image signal source to said SLM which is of an electrical-write type.

* * * * *